United States Patent
Clarke et al.

(10) Patent No.: US 10,069,624 B2
(45) Date of Patent: Sep. 4, 2018

(54) AUTONOMOUS AND SEAMLESS KEY DISTRIBUTION MECHANISM

(71) Applicant: AIRBUS DEFENCE AND SPACE LIMITED, Hertfordshire (GB)

(72) Inventors: Steve Clarke, Hertfordshire (GB); Thomas McCoy, Hertfordshire (GB)

(73) Assignee: AIRBUS DEFENCE AND SPACE LIMITED, Hertfordshire (GB)

( * ) Notice: Subject to any disclaimer, the term of this patent is extended or adjusted under 35 U.S.C. 154(b) by 0 days.

(21) Appl. No.: 14/780,988

(22) PCT Filed: Mar. 28, 2014

(86) PCT No.: PCT/EP2014/056354
§ 371 (c)(1),
(2) Date: Sep. 28, 2015

(87) PCT Pub. No.: WO2014/154890
PCT Pub. Date: Oct. 2, 2014

(65) Prior Publication Data
US 2016/0056957 A1    Feb. 25, 2016

(30) Foreign Application Priority Data
Mar. 28, 2013  (EP) .................................. 13275084

(51) Int. Cl.
*H04L 29/06* (2006.01)
*H04L 9/08* (2006.01)
(Continued)

(52) U.S. Cl.
CPC ....... *H04L 9/0825* (2013.01); *H04B 7/18593* (2013.01); *H04L 63/068* (2013.01); *H04W 12/04* (2013.01); *H04L 2463/062* (2013.01)

(58) Field of Classification Search
CPC ..... H04L 9/0825; H04L 63/068; H04W 12/04
See application file for complete search history.

(56) References Cited

U.S. PATENT DOCUMENTS

| | | | | |
|---|---|---|---|---|
| 2002/0060993 A1* | 5/2002 | Dent | ........................ | H01Q 3/40 |
| | | | | 370/321 |
| 2004/0202328 A1* | 10/2004 | Hara | ....................... | H04H 20/74 |
| | | | | 380/270 |
| 2004/0252053 A1* | 12/2004 | Harvey | ................... | G01S 19/05 |
| | | | | 342/357.75 |

FOREIGN PATENT DOCUMENTS

| | | |
|---|---|---|
| JP | 63046028 | 2/1988 |
| JP | 03113583 | 11/1991 |

(Continued)

OTHER PUBLICATIONS

Encrypted Key Exchange: Password-Based Protocols Secure Against Dictionary Attacks, Bellovin et al., 1992, IEEE, pp. 72-84.*

(Continued)

*Primary Examiner* — Dao Q Ho
(74) *Attorney, Agent, or Firm* — Scarinci Hollenbeck (57) ABSTRACT

A satellite system comprises first and second devices, one of the first and second devices being a satellite and the other one of the first and second devices being a device arranged to send signals to the satellite. A session key can be distributed in the satellite system by obtaining the session key at the first device, protecting the session key at the first device, based on a private key of the first device and a public key of the second device, and transmitting the protected session key from the first device to the second device. Replay detection information can be transmitted with the protected session key, for determining whether the session key has been transmitted previously.

3 Claims, 8 Drawing Sheets

(51) Int. Cl.
*H04W 12/04* (2009.01)
*H04B 7/185* (2006.01)

(56) References Cited

FOREIGN PATENT DOCUMENTS

| | | |
|---|---|---|
| JP | 09505711 | 6/1997 |
| JP | 2007533248 | 11/2007 |
| JP | 2009130746 | 6/2009 |
| JP | 2010087888 | 4/2010 |
| WO | 2007066668 | 6/2007 |

OTHER PUBLICATIONS

I. Aguilar Sanchez et al., "The CCSDS Space Data Link Security Protocol," The 2010 Military Communications Conference—Unclassified Program—Systems Perspectives Track, Oct. 31, 2010, pp. 219-224, XP031844070.

* cited by examiner

AUTONOMOUS AND SEAMLESS KEY DISTRIBUTION MECHANISM

CROSS-REFERENCE TO RELATED APPLICATIONS

This application is a National Stage of International patent application PCT/EP2014/056354, filed on Mar. 28, 2014, which claims priority to foreign European patent application No. EP 13275084.5, filed on Mar. 28, 2013, the disclosures of which are incorporated by reference in their entirety.

FIELD OF THE INVENTION

The present invention relates to key distribution in a satellite system. In particular, the present invention relates to distributing a key in a satellite system by using public-key encryption.

BACKGROUND OF THE INVENTION

Satellites are used in a wide variety of applications. As a few examples, telecommunications satellites can provide television broadcast or other services such as telephone, video or radio communications, Earth observation satellites can provide detailed real-time imaging of the Earth's surface, and positioning satellites in a global navigation satellite system (GNSS) can enable the position of a receiver to be accurately calculated by triangulation.

For any type of satellite, the ability to communicate securely with the satellite is particularly important. Symmetric encryption is often used to prevent an unauthorised third party from receiving and decrypting transmissions from the satellite, and to prevent an aggressor from seizing control of the satellite by transmitting their own control signals to the satellite. A symmetric encryption scheme requires the same session key to be provided to any authorised devices in the satellite system, such as the satellite itself, a control station, and any end-users needing to receive transmissions from the satellite. Authorised devices in the system can communicate securely by encrypting a message with the session key and transmitting the encrypted message, and by decrypting and/or authenticating a received encrypted message using the same session key.

The security of this system would be compromised if an unauthorised party was able to obtain the session key. To guard against this, the session key is periodically expired and replaced with a new session key. In a conventional system, a complex key management infrastructure is required to distribute the new session key to devices within the satellite system. Each device must be pre-loaded with a root Key Encryption Key (KEK), and a key management system, which is a trusted third party, stores the root KEKs of all devices in the system. The key management system can then periodically distribute updated session keys to each device using the root KEK of that device.

The invention is made in this context.

SUMMARY OF THE INVENTION

According to the present invention, there is provided a method of transmitting a session key in a satellite system comprising first and second devices, one of the first and second devices being a satellite and the other one of the first and second devices being a device arranged to send signals to the satellite and/or receive signals from the satellite, the method comprising obtaining the session key at the first device, protecting the session key at the first device, based on a private key of the first device and a public key of the second device, and transmitting the protected session key from the first device to the second device.

Transmitting the protected session key can comprise transmitting the protected session key and replay detection information for determining whether the protected session key has been transmitted previously.

The protected session key and the replay detection information can be included in a key distribution message, or when the second device is the satellite and the first device is a control station for sending command messages to the satellite, the replay detection information can be included in a command message bonded to a key distribution message including the protected session key. The command message can be a telecommand (TC) as defined in the CCSDS TC protocol.

The first device can be the satellite and the second device can be the device arranged to receive signals from the satellite, and the method can further comprise transmitting a data stream from the satellite to the second device, the data stream including a plurality of predefined parts, wherein transmitting the protected session key can comprise transmitting the protected session key through the data stream by inserting a predetermined number of bytes of the protected session key into each one of the plurality of predefined parts. The data stream can be a telemetry (TM) data stream as defined in the Consultative Committee for Space Data Systems (CCSDS) TM protocol.

The obtained session key can be a next session key for use in the next session following a current session, and the method can further comprise obtaining a current session key for use in the current session, protecting the current session key at the satellite, based on a private key of the satellite and a public key of the second device, transmitting the current session key through the data stream, and transmitting validity information through the data stream, the validity information defining a time period in which the current session key is valid and a time period in which the next session key is valid.

The first device can be the satellite and the method can further comprise determining, at the satellite, when to expire the transmitted session key according to one or more predefined key expiry rules.

According to the present invention, there is also provided a method of obtaining a session key in a satellite system comprising first and second devices, one of the first and second devices being a satellite and the other one of the first and second devices being a device arranged to send signals to the satellite and/or receive signals from the satellite, the method comprising receiving a protected session key from the first device, at the second device, and obtaining the session key from the received protected session key at the second device, based on a public key of the first device and a private key of the second device.

The method can further comprise obtaining information about an expected location of the first device when the protected session key was transmitted, and determining that the received protected session key is authentic if a location from which the protected session key was received matches the expected location of the first device, within a predetermined margin of error.

The method can further comprise receiving replay detection information for determining whether the protected session key has been transmitted previously.

Receiving the protected session key from the first device can comprise receiving the protected session key in a key distribution message bonded to a command message, the replay detection information being included in the command message, and the method can further comprise determining that the protected session key has not been transmitted previously if the replay detection information indicates that the command message bonded to the key distribution message has not been transmitted previously.

The first device can be the satellite and the second device can be the device arranged to receive signals from the satellite, and receiving the protected session key from the first device can comprise receiving a data stream from the satellite at the second device, the data stream including a plurality of predefined parts, extracting a predetermined number of bytes of the protected session key from each one of the plurality of predefined parts, and combining the extracted bytes of the protected session key to obtain the protected session key.

The obtained session key can be a next session key for use in the next session following a current session, and the method can further comprise receiving a protected current session key for use in the current session, and validity information defining a time period in which the current session key is valid and a time period in which the next session key is valid, through the data stream, obtaining the current session key from the protected current session key at the second device, based on a public key of the satellite and a private key of the second device, obtaining information about a time at which protected data was transmitted through the data stream, and accessing the protected data based on the current session key if the obtained information indicates that the protected data was transmitted during the time period in which the current session key is valid, or accessing the protected data based on the next session key if the obtained information indicates that the protected data was transmitted during the time period in which the next session key is valid.

A computer-readable storage medium can be arranged to store a computer program which, when executed by a device, causes the device to perform the method.

According to the present invention, there is also provided a first device comprising a key obtaining module arranged to obtain a session key, a key protecting module arranged to protect the obtained session key, based on a private key of the first device and a public key of a second device to which the protected session key is to be transmitted, and a transmitter arranged to transmit the protected session key to the second device, wherein the first device and/or the second device is a satellite.

The first device can further comprise a replay information generator arranged to generate replay detection information for determining whether the protected session key has been transmitted previously, and the transmitter can be arranged to transmit the protected session key and the replay detection information to the second device.

The first device can be a satellite arranged to transmit a data stream to the second device, the data stream including a plurality of predefined parts, and the transmitter can be arranged to transmit the protected session key through the data stream by inserting a predetermined number of bytes of the protected session key into each one of the plurality of predefined parts Alternatively, the second device can be the satellite and the first device can be a control station for sending command messages to the satellite, and the transmitter can be arranged to include the replay detection information in a command message bonded to a key distribution message including the protected session key.

According to the present invention, there is also provided a first device for receiving signals from a second device, the first device comprising a receiver arranged to receive a protected session key from the second device, and a key extraction module arranged to obtain the session key from the protected session key, based on a private key of the first device and a public key of the second device from which the protected session key was received.

BRIEF DESCRIPTION OF THE DRAWINGS

Embodiments of the present invention will now be described, by way of example only, with reference to the accompanying drawings, in which.

DETAILED DESCRIPTION

Figure 1:
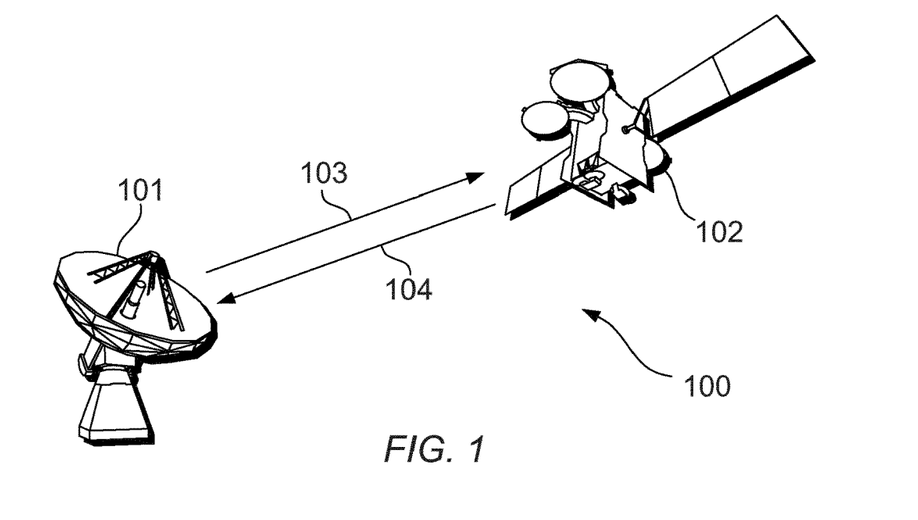
FIG. 1 illustrates a system including a satellite and a device for communicating with the satellite, according to an embodiment of the present invention.

Referring now to FIG. 1, a system including a satellite and a device for communicating with the satellite is illustrated, according to an embodiment of the present invention. The system 100 can be referred to as a satellite system. In the present embodiment, the device 101 is a ground-based control station arranged to both transmit and receive signals, so that the control station 101 is able to transmit a signal 103 to the satellite 102 and also receive a signal 104 from the satellite 102. However, in another embodiment the device 101 may only be arranged to transmit signals to the satellite or may only be arranged to receive signals from the satellite. For example, the device 101 could be a receive-only antenna for receiving television broadcast signals or other types of signals from the satellite 102, or could be another satellite. Embodiments of the present invention can be applied to communications with any type of satellite, including but not limited to a communications satellite, a positioning satellite for use in a global navigation satellite system (GNSS), a scientific research satellite, or an earth observation satellite. Although FIG. 1 illustrates a satellite communicating with one other device, embodiments of the present invention can include any number of devices, for example any number of satellites, ground stations, receive antennae, and so on.

In the system 100 of the present embodiment, the control station 101 is arranged to send control signals 103 to the satellite 102 and receive telemetry signals 104 back from the satellite 102. Examples of control signals 103 which can be sent by the control station 101 include telecommands to make adjustments to the position and/or orientation of the satellite 102 or to move the satellite 102 to a new orbit. The telemetry signals 104 can provide information about the current status of the satellite 102, for example satellite configuration, power, or thermal monitoring data.

Similar to a conventional system, transmissions on both the uplink 103 and downlink 104 channels are encrypted using session keys in order to prevent an unauthorised user controlling the satellite or obtaining telemetry data from the satellite. During a session, transmissions are encrypted using the current session key, which is known to the transmitter and the receiver(s). At the end of a session, the current session key is expired and subsequent transmissions are encrypted using the next session key. However, in contrast to the conventional system, which requires new session keys to be periodically distributed by a trusted third party, in the present embodiment the distribution of updated session keys can be handled by the device 101 and/or the satellite 102 using public-key cryptography, without the need for separate key management infrastructure.

The basic principles of public-key cryptography are well understood, and will not be described in detail here. In brief, a private key and a public key are generated for each device in a satellite system, such as the device 101 and the satellite 102 in the satellite system 100 of FIG. 1. The device 101 and the satellite 102 are each arranged to store their own private key, as well as the public key of the other device 101, 102. In general, the public key of each device in a satellite system is made available to any other devices in the satellite system.

In embodiments of the present invention, a device in the satellite system can distribute a session key by protecting the session key based on the device's own private key and the public key of an intended recipient, and transmitting the protected session key. Examples of types of protection that can be applied to the session key include public-key encryption and/or authentication. Public-key encryption can be used to authentically derive a shared secret, and an algorithm such as Advanced Encryption Standard (AES) Keywrap with padding can use the shared secret to provide confidentiality and integrity to the shared secret.

Encryption provides confidentiality, by preventing exposure of the session key or other encrypted data to unauthorised third parties. Authentication provides an assurance that the transmission comes from a trusted source. An example of a cryptographic encryption algorithm is an Advanced Encryption Standard Cipher Block Chaining (AES-CBC) algorithm, and an example of a cryptographic authentication algorithm is an Advanced Encryption Standard Cipher-based Message Authentication Code (AES-CMAC) algorithm. An Advanced Encryption Standard Counter with CBC-MAC (AES-CCM) algorithm provides both encryption and authentication. Other algorithms which provide either encryption or authentication, or both encryption and authentication, are also known in the art.

To decrypt or encrypt a session key, a device derives a shared secret based on its own private key and the public key of the sender or recipient, as appropriate. The shared secret can then be used to encrypt a session key or to decrypt a received encrypted session key. The shared secret can be referred to as a key encryption key, that is, a key which is used to encrypt the session key. Example mechanisms for deriving the shared secret include an elliptic-curve Diffe-Helman (ECDH) method and a high performance secure Diffe Helman protocol (HMQV). Because the private keys are not shared between devices, the encrypted session key can only be decrypted by the device 101, 102 whose public key was used to encrypt the message.

In the example of a control station transmitting a session key, authentication can be used with or without encryption. Authentication allows the satellite to verify that the received session key has come from a trusted source. In another example, a satellite can transmit a session key using encryption with or without authentication. In this example, authentication may not be required due to the difficulty in spoofing a signal from a satellite. Specifically, to spoof a signal from a satellite an attacker would have to transmit a signal from the same position as the satellite, which is currently impractical. At the same time, encryption prevents the session key being obtained by any unauthorised third party which receives signals from the satellite.

It will be appreciated that in order to decrypt and/or authenticate a received session key, which has been protected using public-key cryptography, the receiver needs to know which public key should be used in decryption/authentication. In satellite systems which only include two devices, each device only has to store one public key, which is the public key of the other device. In such systems, each device can assume that any received messages have come from the only other device in the system, and decrypt any received messages using the stored public key of the other device. However, in satellite systems which include more than two devices, each device may store a plurality of public keys, specifically, one public key for each other device in the system. In such embodiments, when a device transmits a message using public-key cryptography, for example a key distribution message, the device can also transmit an identifier for identifying the source device from which the transmission originated. Then, any device in the system which receives the message can identify the source device based on the included identifier, and select the public key corresponding to the identified device for decrypting and/or authenticating the session key included in the message. The identifier should be transmitted without public-key protection, so that the receiving device can obtain the identifier without having to use a public key of the source device.

As an alternative, a session key can be transmitted without an identifier. In this case, the receiver could identify the appropriate public key by trial and error, by attempting to decrypt and/or authenticate the key distribution message with each set of security attributes associated with each of the possible transmitters in the system, and process the one that successfully decrypts and/or authenticates. Alternatively, the device may select the appropriate set of security attributes based on some other known parameter, such as the physical location of the transmitter, or the particular antenna through which the message was received.

In the present embodiment, either one of the device 101 and the satellite 102 can be responsible for session key distribution in the satellite system 100. Specifically, one of the devices 101, 102 can encrypt a new session key using public-key encryption as described above, and transmit the encrypted session key to the other device 101, 102. In this way, both devices 101, 102 can obtain the same session key and can communicate subsequently using symmetric-key encryption, which is more efficient than public-key encryption. At the same time, the use of public-key encryption to transmit the session key prevents an unauthorised third party from obtaining the session key.

Here, the term "session" refers to a defined period in which one or more communications are exchanged between devices using the same session key for symmetric encryption. The session key in use during the current session can be referred to as the "current session key", and a session key for use in a subsequent session can be referred to as the "next session key".

The duration of any given session can be predefined by the system architecture, and can be a period defined with respect to time or any other suitable variable. For example, in one embodiment the current session key can be expired after a predetermined number of telecommands have been transmitted, and replaced with the next session key. In this case, each session can be defined as a period in which the predetermined number of telecommands are transmitted. In another embodiment, each session can be a predetermined time period, for example one day, week, or month. At the end of each predetermined time period, the session ends and the current session key is expired, and in the next session the devices communicate using the next session key. Other examples of ways in which sessions can be defined include a predetermined limit of transmitted data being reached, for example 250 megabytes (MB), or a predetermined number of overhead passes of a satellite. As a further example, in the case of an earth observation satellite which transmits images to one or more users or groups of users, each session can last for a predetermined number of images. After the predetermined number of images have been transmitted in a session, the current session key is expired and the next session begins, with devices communicating using the next session key.

Devices in the satellite system can each be provided with one or more predefined rules defining the duration of sessions in that particular system, such as the rules described above, to allow each device to independently determine when each session ends and the next session begins. Alternatively, one device could determine when one session ends and the next begins, and this device could signal the end of each session to other devices in the system so that the other devices know when to expire the current session key and begin using the next session key in communications.

Figure 2:
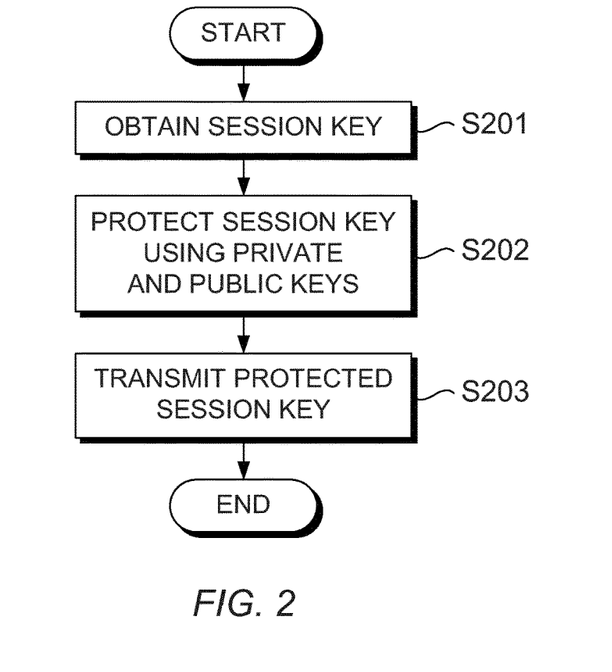
FIG. 2 illustrates a method of providing a symmetric key in the system of FIG. 1, according to an embodiment of the present invention.

A method of distributing a session key in the system of FIG. 1 will now be described in more detail, with reference to FIG. 2. The device responsible for transmitting the session key will hereinafter be referred to as a first device, and the device which receives the session key will be referred to as a second device. For example, in the system of FIG. 1, either one of the satellite 102 and the control station 101 can be the first device, with the other one of the satellite 102 and the control station 101 being the second device. In general, the method can be used by any device in a satellite system to provide a session key to any other device in the satellite system. For example, a satellite can use the method to provide a session key to a device if that device is able to receive signals from the satellite, or a device can use the method to provide a session key to a satellite if the device is able to transmit signals to the satellite.

In the first step S201, the session key to be transmitted is obtained. Here, the session key can be generated by the first device, or can be obtained by the first device from a separate source, which may be referred to as a key generator. In the present embodiment, the session key is generated by the same device which is to be used for distributing the session key, that is, by the first device.

After the session key is obtained, in step S202 the first device protects the session key based on its own private key and the public key of the second device, that is, the public key of the device to which the session key is to be sent. To protect the session key, the first device can use public-key encryption and/or authentication. Then, in step S203, the first device transmits the protected session key to the second device, which is the device whose public key was used when protecting the session key. When encryption is used, the encrypted session key may be broadcast to a plurality of devices in the system, but can only be decrypted using the private key of the second device. Therefore even if other devices in the system receive the encrypted session key, only the second device can decrypt the received signal to obtain the session key. When authentication is used, the second device will only accept the received session key if authentication using the public key of the first device is successful.

Figure 3:
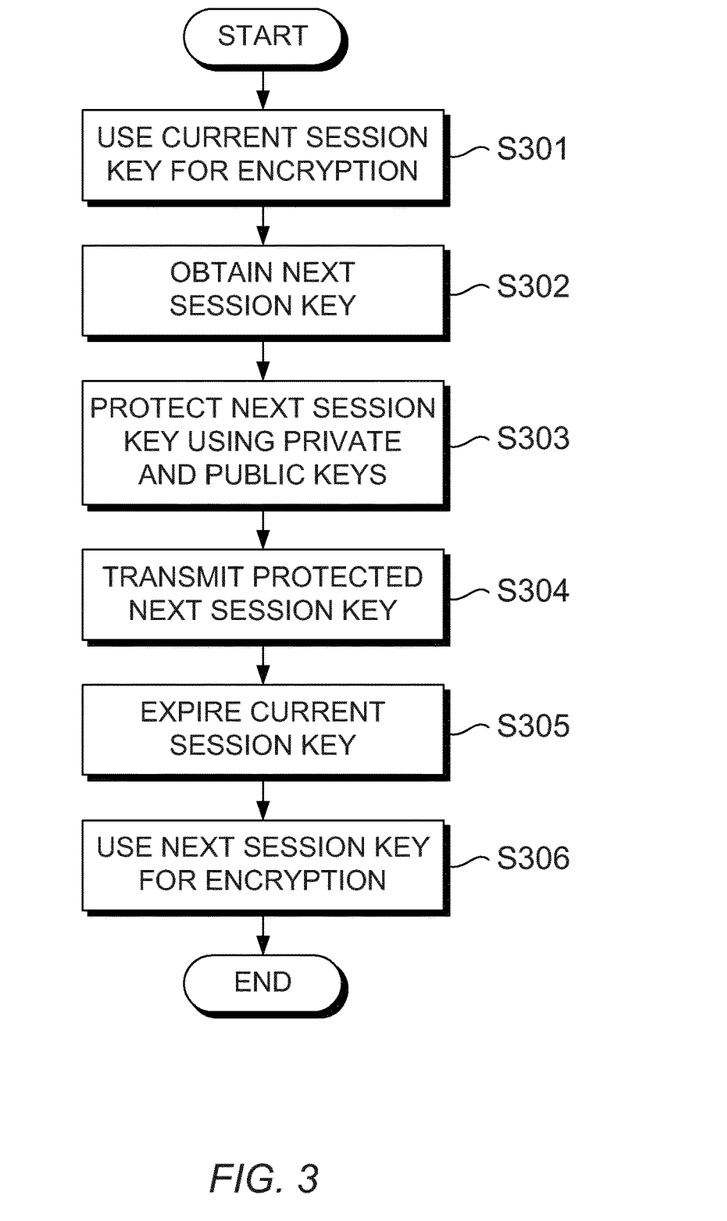
FIG. 3 illustrates a method of managing symmetric key distribution in a satellite system, according to an embodiment of the present invention.

Referring now to FIG. 3, a method of managing key distribution in a satellite system is illustrated, according to an embodiment of the present invention. As in FIG. 2, the device which is responsible for obtaining and distributing session keys can be referred to as a first device, and any device in the satellite system which receives the session keys can be referred to as a second device. In the present embodiment, the first device is the control station 101 of FIG. 1, and the second device is the satellite 102 of FIG. 1. However, in general, in embodiments of the present invention the task of managing session key distribution in the satellite system can be assigned to any device in the system which is capable of transmitting data to other devices in the system, for example a satellite or ground equipment such as a control station.

First, in step S301, the control station and the satellite communicate using the current session key, which is the session key that is valid for the current session. The current session key can be a key which was previously distributed using a method such as the one shown in FIG. 2, or using a different method. For example, the satellite and control station could be pre-loaded with one or more initial session keys during setup of the satellite system, before the satellite is launched. However, in embodiments of the present invention pre-loading is not essential, because session keys can be securely distributed once the satellite is in-orbit. As described above, the control station can communicate with the satellite by encrypting data using the current session key and transmitting the encrypted data to the satellite, which can then decrypt the encrypted data using the same current session key. Similarly, the satellite can communicate with the control station by transmitting data which has been encrypted using the current session key.

Although in the present embodiment the devices communicate using a current session key in step S301, in some scenarios it is possible that the device will not initially have knowledge of the current session key. For example, when a device is powered on after being inactive for a period of time, the device may not have been updated with the current session key. Similarly, when a new device is added to the system, for instance when a new user has subscribed to receive satellite services, the device will not have knowledge of the current session key. To address this problem, in some embodiments of the present invention, the device responsible for key distribution can periodically transmit key distribution messages which include both the current session key and the next session key. This ensures that a device without previous knowledge of the current session key is able to receive communications during the current session rather than having to wait for the next session to begin.

Then in step S302, the control station obtains a second session key, which is the next session key that will be valid in the next session. As in step S201 of FIG. 2, the next session key can be generated by the control station or can be obtained from another source, for example a third-party key provider. In the present embodiment, in step S302 the next session key is generated by the control station. The next session key can be obtained by the control station at any time.

After the next session key has been obtained, in step S303 the control station protects the next session key using the private key of the control station and the public key of the device to which the next session key is to be transmitted, in this case the satellite. In the present embodiment, the control station uses the public/private key establishment mechanism in conjunction with a key encryption algorithm to provide confidentiality, integrity and authenticity protection to the session key. In other embodiments, the key establishment mechanism may provide direct protection of the session key, without the use of a separate key encryption algorithm. Next, in step S304 the protected next session key is transmitted to the satellite. Steps S303 and S304 can be performed in a similar manner to steps S202 and S203 of the method of FIG. 2.

At any time after the protected next session key has been transmitted to the satellite in step S304, the current session key can be expired in step S305. Here, 'expired' means that the current session key can no longer be used in communications between the first and second devices. For example, the expired session key can be deleted from memory, or can be retained but flagged as 'expired' to prevent that key from being used in future. As described above, a device can determine when to expire a session key according to a predefined rule, which defines when one session ends and another begins. The current session key is expired at the end of the current session, and the next session key is used when the next session begins. The next session may begin immediately after the current session ends, or some time after the current session ends.

Although the current session key has been expired, both devices now have the next session key key which was transmitted previously in step S304. Therefore in step S306, the first and second devices can continue to communicate in the next session by using the next session key to encrypt communications. Devices in a satellite system can therefore use the method of FIG. 3 to periodically distribute new session keys in a secure manner, without the need for a third-party key management infrastructure. Regularly changing the session keys that are used for encryption provides additional security since this controls the amount of data encrypted with the same key, reducing the amount of data available in a given time to an aggressor to use in a brute-force attack.

Although the method of FIG. 3 has been described above in relation to communication between a control station and a satellite, in other embodiments the method may be used by any devices within a satellite system.

Key expiration can be handled by any device in the satellite system, which does not necessarily have to be the same device that is responsible for distributing new session keys. In the present embodiment, key expiration is handled by the satellite and key distribution is handled by the control station. Making the satellite responsible for key expiration allows the satellite to enforce security access to the satellite. A method of expiring a session key in a satellite system will now be described with reference to FIG. 4.

Figure 4:
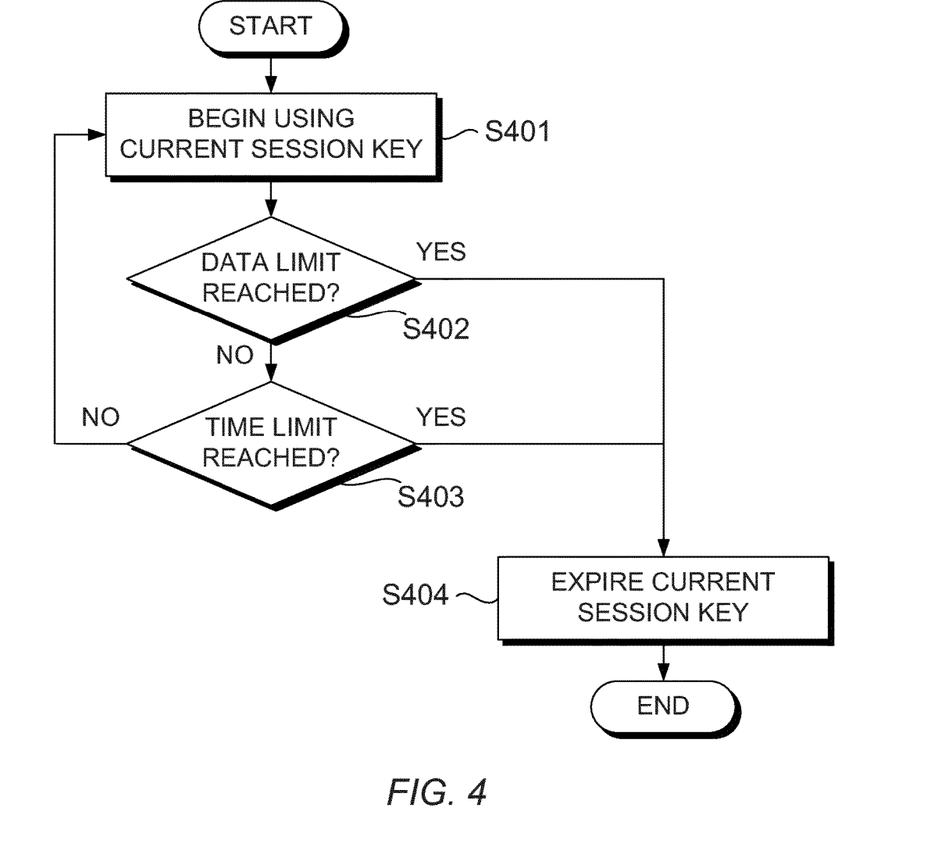
FIG. 4 illustrates a method of expiring a symmetric key in a satellite system, according to an embodiment of the present invention.

First, in step S401, a device begins using a current session key to encrypt communications in a satellite system. For example, the device may begin using the current session key after the previous session key has been expired, as described above with reference to FIG. 3.

While the current session key is in use, the device can repeatedly check whether to start a new session based on predetermined rules. In the present embodiment, the predetermined rules define predetermined limits for a plurality of usage indicators, and the device determines that the current session key should be expired and a new session begun if any of the predetermine limits have been reached or exceeded. For example, the device can perform the check periodically and/or can perform the check every time encrypted data is transmitted or received using the current session key. In the present embodiment the usage indicators include an amount of data which has been encrypted with the current session key up to the current point in time, and a total time period for which the current session key has been in use, although different usage indicators could be used. In other embodiments, a different predetermined rule or plurality of rules may be used.

Specifically, in step S402 the device checks whether the total amount of data sent and received using the current session key has reached or exceeded the predefined data limit, and if not, in step S403 the device checks whether the current session key has been in use for a predetermined time period. If the result of both checks is negative, the device returns to step S401 and continues using the current session key. However, if the result of either check is positive, then the device expires the current session key in step S404.

The total amount of data that has been encrypted using the current session key can include data which has been received by the device as well as data which has been transmitted by the device. As an example, when the device is a control station arranged to transmit command messages, which may also be referred to as telecommands, to the satellite, the total number of command messages that have been encrypted using the current session key can be recorded as the total amount of data. As another example, when the device is an Earth observation satellite arranged to transmit Earth observation data to ground users through a data stream, the total amount of data can be the total amount of data transmitted through the data stream using the current session key.

The risk of a session key being compromised, for example by a third party breaking the encryption using a brute-force approach, may increase as more data is encrypted and transmitted using the current session key, and as the current session key is used for longer time periods. Therefore a method such as the one shown in FIG. 4 can ensure that the current session key is expired and replaced with a new session key before the risk of a security breach becomes too high.

Figure 5:
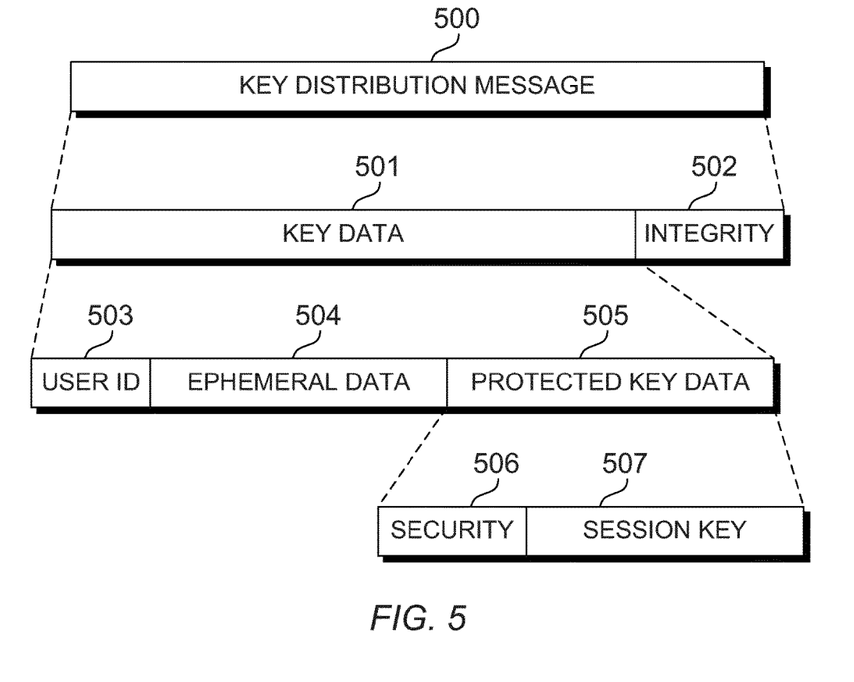
FIG. 5 illustrates a key distribution message for distributing a symmetric key in a satellite system, according to an embodiment of the present invention.

Referring now to FIG. 5, a key distribution message for distributing a session key in a satellite system is illustrated, according to an embodiment of the present invention. The key distribution message 500 includes a key data part 501 and an integrity part 502. In other embodiments the integrity part 502 can be omitted. The key data part 501 includes a user identifier (ID) 503, ephemeral data 504, and protected key data 505. The ephemeral data 504 is dependent on the cryptographic algorithm used, and can include an ephemeral key for use in deriving a shared secret.

In the present embodiment the protected key data 505 holds security attributes 506 about the session key that is being transmitted, as well as the session key itself 507. In other embodiments, the security information 506 may be omitted and the encrypted key data 505 may only include the encrypted key 507. A security attribute can be used to enable a security function or service, such as encryption or decryption. Examples of security attributes that can be transmitted in the key distribution message 500 include the next session key, integrity verification information, key validity information to define the period over which the key is valid, and replay detection information to guarantee that the key has not been used before. Security Attributes can also include other information, such as the rights associated with the user role, and access rights for different users which can be stored along with public keys of the different users. These can be used to identify users who are allowed, for instance, to command the satellite, control a cryptographic module on the satellite, upload or delete other user's public keys and so on.

In the present embodiment, a receiving device stores public keys for a plurality of other devices in the satellite system. The receiving device, for example the satellite or control station of FIG. 1, obtains the key distribution message 500 from the received data, identifies the source of the key distribution message 500 based on the user identifier 503, and derives the shared secret associated with that user in order to decrypt the encrypted key data 505. In this way the device can use the shared secret to obtain the security attributes 506 and the session key 507. Because asymmetric encryption is used, only the device for which the key distribution message 500 is intended is able to obtain the security attributes 506 and the session key 507. Example mechanisms for deriving the shared secret include ECDH and HMQV. The security attributes can be obtained, for example, by using the Advanced Encryption Standard (AES) Keywrap with padding.

The device responsible for session key distribution in the satellite system can store separate security attributes for different devices in the satellite system. Examples of security attributes that can be stored for each other device include a user id of the other device, a public key of the other device, replay detection information, a session key currently in use by the other device, and key validity information defining a period in which the current session key is valid.

The replay detection information can be used by a device receiving the key distribution message 500 to determine whether the same key distribution message 500 has been transmitted previously, which can be an indicator that received message is one which has been replayed by an aggressor, for example to trick the receiving device into using the wrong session key. If the message has been replayed, this means that the encrypted session key 507 included in the key distribution message 500 has been transmitted previously. To detect when a key distribution message has been replayed, the device responsible for distributing new session keys can include unique replay detection information in the message each time a key distribution message is transmitted.

The replay detection information changes from one message to the next in a predictable manner. An example of replay detection information is a counter, that is, a numerical value included in a predetermined position in the key distribution message. The value of the counter is incremented from one key distribution message to the next. For example, the first message transmitted after the system is initialised can include the counter value 1, the second message can include the counter value 2, the third message can include the counter value 3, and so on. It will be understood that a counter is only one example of replay detection information, and another example could be a pseudo-random number (PRN) obtained by an algorithm known to both the sender and receiver. The use of replay detection information will be described in more detail later with reference to FIG. 9.

It will be understood that although one exemplary structure of a key distribution message is shown in FIG. 5, the present invention is not limited to this particular structure and in other embodiments of the invention different message structures may be used for the key distribution message. For example, if compatibility is required with a particular communications standard, an embodiment of the present invention could adapt a message structure defined in that standard as a key distribution message.

Figure 6:
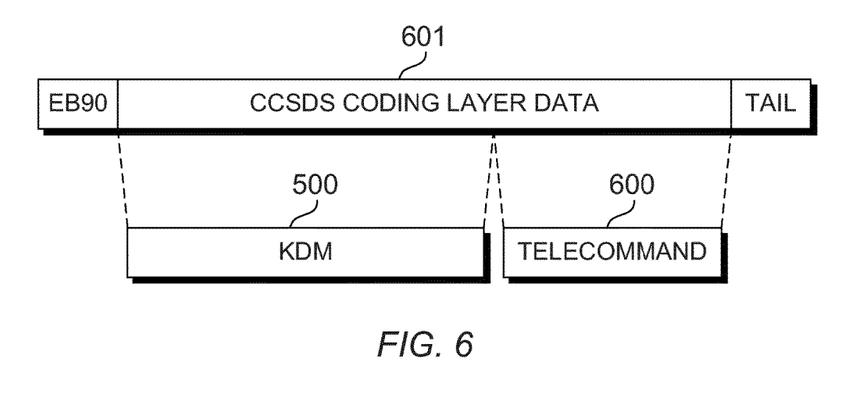
FIG. 6 illustrates a key distribution message in a system operating according to a Consultative Committee for Space Data Systems (CCSDS) packet telecommand standard, according to an embodiment of the present invention.

Referring now to FIG. 6, a key distribution message in a system operating according to a Consultative Committee for Space Data Systems (CCSDS) standard is illustrated according to an embodiment of the present invention. In the present embodiment, the key distribution message 500 of FIG. 5 is pre-pended to an encrypted transfer layer telecommand 600, and transmitted as CCSDS coding layer data 601. This transmission approach can be used, for example, by a control station which is arranged to send telecommands to a satellite in order to control the satellite. It will be understood that a similar approach can also be used to transmit a key distribution message in systems which operate according to protocols other than CCSDS, and can be applied for other security layers at different positions within the stack.

When a satellite receives the transmission shown in FIG. 6, including a key distribution message 500 bonded to a telecommand message 600, the satellite decrypts the telecommand message 600 using the current session key which is currently valid for transmissions between the satellite and the source device from which the transmission was received. The current session key can be one which has previously been received and which is valid during a time-period in which the telecommand 600 was received, or can be a new session key defined in the key distribution message 500 pre-pended to the received telecommand 600. In an embodiment of the present invention, a control station is arranged to only transmit a key distribution message to a satellite when starting a new session. In this embodiment, the satellite is arranged to respond to a key distribution message by expiring the previous session key and using the received session key as the current session key. Therefore the start of a new session is signalled by the presence of a key distribution message, meaning that it is not required to also transmit validity information defining the period in which each session key is valid.

In the present embodiment, replay detection information is included in the key distribution message 500 as described above with reference to FIG. 5. The satellite can check the received replay detection information to determine whether the key distribution message 500 is authentic.

The key distribution message 500 can also be bonded to the telecommand 600, as shown in FIG. 6. This allows the satellite to determine that the telecommand 600 is authentic if the key distribution message 500 is also determined to be authentic. Once the authenticity of the key distribution message 500 and the telecommand 600 has been verified, the telecommand 600 can be passed to its destination function within the spacecraft, for example the spacecraft computer, payload, or crypto controller.

In another embodiment the replay detection information is included in the telecommand 600 instead of the key distribution message 500. The satellite can use the replay detection information to determine whether the telecommand is authentic, and if the telecommand is determined to be authentic, it is assumed that the key distribution message and the key contained therein are also valid.

When a key distribution message 500 is bonded to a telecommand 600, replay detection information can be shared between the key distribution message 500 and the telecommand 600. Therefore it is not necessary to include replay detection information in both the key distribution message 500 and the telecommand 600.

Although the present embodiment is described in relation to a control station sending a telecommand message to a satellite, in other embodiments a similar approach to that used in FIG. 6 can be applied to communications between any two devices in a satellite system, by transmitting a key distribution message bonded to another message, which could be a telecommand or could be any other type of message.

Figure 7:
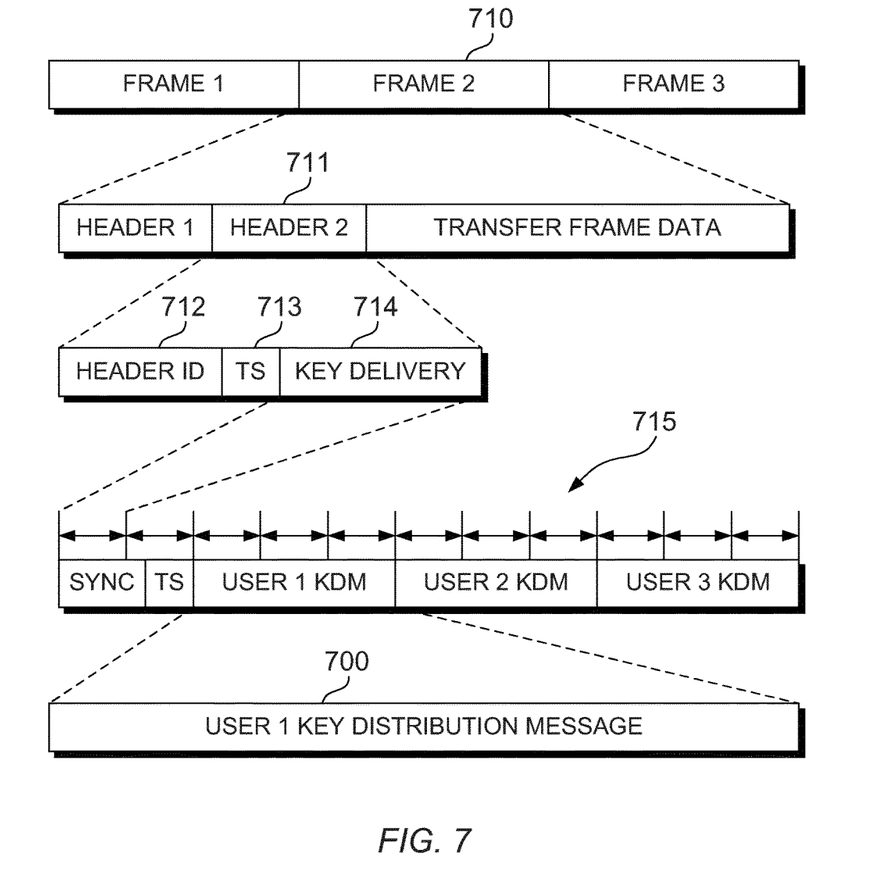
FIG. 7 illustrates the transmission of a key distribution message through a CCSDS telemetry stream, according to an embodiment of the present invention.

Referring now to FIG. 7, the transmission of a key distribution message through a CCSDS telemetry stream is illustrated, according to an embodiment of the present invention. A CCSDS telemetry stream from a satellite can be received, for example by ground equipment such as a control station, to monitor the satellite's status. Although the present embodiment is described in relation to a CCSDS telemetry stream, it will be understood that the present invention is not limited to the CCSDS standard and embodiments can be used to distribute session keys through any type of data stream.

As shown in FIG. 7, the CCSDS telemetry data stream 710 is divided into a plurality of transfer frames, each including a transfer frame primary header, and transfer frame data. The transfer frame data holds bytes of the data which is being transmitted through the data stream, which in the present embodiment is telemetry data but in general could be any type of data. The transfer frame primary header is the standard transfer frame header defined in the CCSDS standard.

In addition, in the present embodiment each transfer frame includes a transfer frame secondary header 711 which is used to provide a key distribution stream to one or more receivers. In particular, each transfer frame secondary header 711 includes a header ID 712, time stamp (TS) 713, and a key delivery part 714 holding a predetermined number of bytes of a key distribution stream 715. In this way, the key distribution stream 715 is sub-commutated into the telemetry data stream 710. A device receiving the telemetry data stream 710 can reconstruct the key distribution stream 715 by extracting the key delivery bytes 714 from the transfer frame secondary header 711 of each frame and combining the extracted bytes.

The key delivery bytes 714 and the transfer frame data are protected using the public/private keys of the associated parties, and the receiver can use the TS 713 to identify which session key to use to decrypt and/or authenticate the transfer frame data. Specifically, the TS 713 indicates the time at which the satellite transmitted that transfer frame, and therefore determines which session key the satellite used to protect data in the transfer frame.

For example, a satellite may transmit a telemetry stream which includes a key distribution message for user A and a key distribution message for user B. Each key distribution message includes a current session key and a next session key, and validity information defining the period in which each key is valid, as shown below:

User A key distribution message:
  Key 1, encrypted for user A, valid from 12:00 to 14:59
  Key 2, encrypted for user A, valid from 15:00 to 17:59
User B key distribution message:
  Key 1, encrypted for user B, valid from 12:00 to 14:59
  Key 2, encrypted for user B, valid from 15:00 to 17:59

The validity periods are defined with reference to the satellite's internal clock. If, for example, a transfer frame is received with a time stamp of 15:00 when the receiver's internal clock indicates a time of 14:59, the receiver will determine that Key 2 is the current session key based on the received time stamp, even though the receiver's internal clock would appear to indicate that the current session key is actually Key 1.

In the above example, if user A receives a transfer frame including the time stamp "12:20", the receiver can determine that the current session key is Key 1, valid from 12:00 to 14:59. The receiver therefore uses Key 1 to decrypt and/or authenticate the key delivery bytes and transfer frame data in the current transfer frame. However, when user A later receives a transfer frame including the time stamp "15:00", the receiver determines that Key 2 is now the current session key accordingly uses Key 2 to decrypt and/or authenticate the key delivery bytes and transfer frame data.

Also, when or after the time stamp rolls over from 14:59 to 15:00, the content of the key distribution messages will change to reflect the new 'current' and 'next' session keys, as follows:

User A key distribution message:
  Key 2, encrypted for user A, valid from 15:00 to 17:59
  Key 3, encrypted for user A, valid from 18:00 to 20:59
User B key distribution message:
  Key 2, encrypted for user B, valid from 15:00 to 17:59
  Key 3, encrypted for user B, valid from 18:00 to 20:59

Although in the present embodiment the time stamp and validity periods are defined in hours and minutes, in other embodiments the time stamp and validity periods could, for example, be defined using an arbitrary counter.

Also, although in the present embodiment the receiver uses a time stamp in the transfer frame to determine which session key to use for that transfer frame, in other embodiments the time stamp can be omitted. For example, the receiver could obtain information about an offset between the receiver's internal clock and the satellite's internal clock, for instance from a time offset calculated when obtaining a global positioning system (GPS) position fix. The receiver could then use the local time at which the transfer frame was received, the offset between the receiver and satellite docks, and an estimated travel time of the signal to estimate the time according to the satellite's clock at which the transfer frame was transmitted.

As shown in FIG. 7, the key distribution stream 715 includes key distribution messages 700 for a plurality of user groups. Each user group could represent a single user or could include a plurality of users who will share the same session keys, and hence have access to the same data. Each key distribution message 700 can, for example, be formatted as shown in FIG. 5. In a data stream such as the stream 710 shown in FIG. 7, data intended for different user groups can be encrypted using different symmetric keys and transmitted through the data stream. By providing separate key distribution messages for different user groups, each user group can be supplied with their own symmetric key in order to decrypt their own data, while preventing users from one group from accessing data intended for another user group. Each user group's key can be periodically expired and replaced with an updated key.

The approach illustrated in FIG. 7 provides a bandwidth-efficient key delivery mechanism for multiple ground terminals, and can be implemented using existing protocols, such as the CCSDS packet telemetry standard. Specifically, bandwidth in the telemetry data stream is conserved because only a small number of bytes of the key distribution stream are passed in each downlink frame. The present embodiment can therefore supply session keys to one or more end users without any significant impact on the bandwidth available for the primary transfer stream data, which in the present embodiment is telemetry data. The approach can be used to distribute keys to terminals in the satellite system which have a receive-only capability, and as such do not have a mechanism by which they can upload a key for their use. For example, an Earth-observation satellite can use the approach shown in FIG. 7 to distribute session keys through a data stream to a plurality of ground-based receivers operated by authorised users.

As an example, in a typical Earth Observation system where the downlink is operating at 150 megabits per second (Mbps), with frames of 16 kilobits (Kbits), the time-stamp would wrap every 5 days. If each key were 1024 bits in size, and there were 500 end users, it would take just over 3 seconds for each user to receive their now and next keys.

In another example, in a typical telemetry tracking and command (TT&C) communications system where the downlink is operating at 64 kilobits per second (Kbps), with a frame size of 4 Kbits, the time-stamp would wrap every 8.5 years, and with 3 end users, it would take approximately 12 seconds for the users to receive their now and next keys.

Although in the present embodiment session keys are distributed through a CCSDS telemetry stream including a plurality of frames, in other embodiments the session keys can be distributed through any data stream that is divided into a plurality of predefined parts, which may for example be referred to as frames or packets according to the particular standard chosen for that embodiment. Key distribution messages can be included in the data stream using sub-commutation, by including a predetermined number of bytes of the key distribution message in each part of the data stream.

Figure 8:
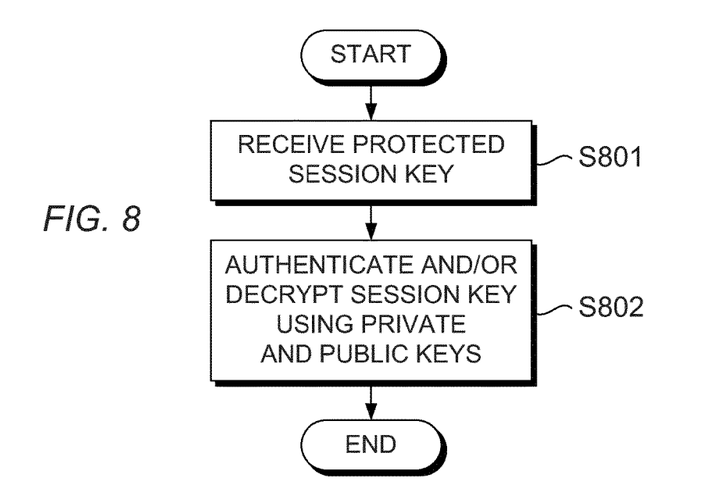
FIG. 8 illustrates a method of receiving a symmetric key in a satellite system, according to an embodiment of the present invention.

Referring now to FIG. 8, a method of receiving a session key in a satellite system is illustrated, according to an embodiment of the present invention. The method can be used by any device in a satellite system, including but not limited to a satellite or other spacecraft, control station, and an end-user receiver (e.g. television broadcast receiver).

First, in step S801, a protected session key is received. For example, the session key can be protected using encryption and/or authentication. The session key may be received in a key distribution message such as the one shown in FIG. 5, and could be received bonded to a telecommand as shown in FIG. 6 or through a telemetry data stream as shown in FIG. 7.

Then, in step S802, the protected session key is authenticated and/or decrypted based on the private key of the receiver and the public key of the sender. For example, a shared secret can be obtained using ECDH or HMQV, and used to decrypt the session key. Once the received session key has been decrypted and/or authenticated, it can be used in subsequent communications between the two devices in the satellite system.

Figure 9:
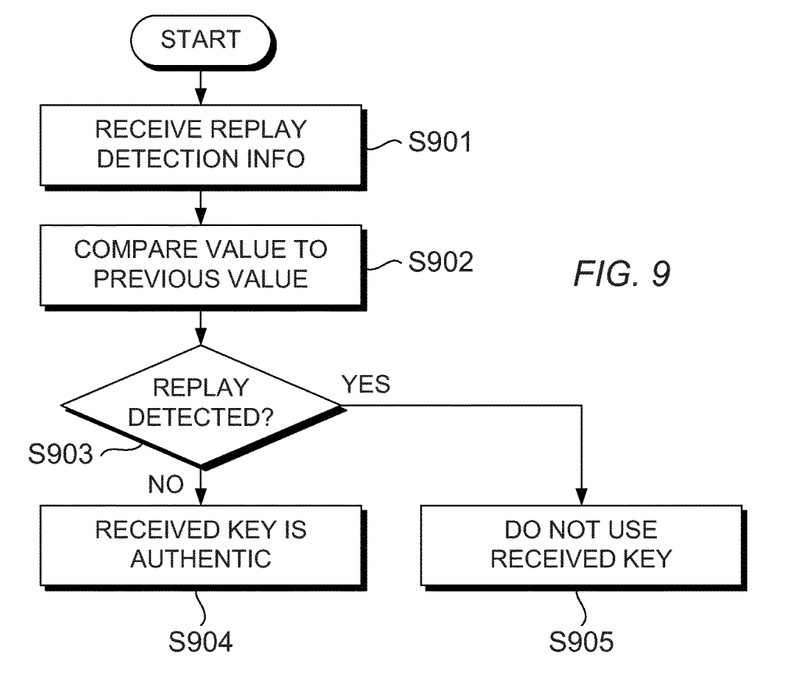
FIG. 9 illustrates a method of using replay detection information, according to an embodiment of the present invention.

Referring now to FIG. 9, a method of using replay detection information is illustrated, according to an embodiment of the present invention. As with the method of FIG. 8, the method of FIG. 9 can be used by any device in a satellite system.

First, in step S901, replay detection information is received together with an encrypted session key. In the present embodiment the replay detection information is included in a command bonded to the encrypted session key as shown in FIG. 6. However, in another embodiment the replay detection information may be included with the encrypted key in a key distribution message as shown in FIG. 5. When replay detection information is received, then in step S902 the receiving device compares the value of the received replay detection information to the previously-received value, that is, the value of the replay detection information in the last successful message preceding the current key distribution message.

In step S903, it is checked whether a predetermined condition is met. An example of a predetermined condition could be whether the current value of the replay detection information is greater than the previous value. If the current value is greater, it is assumed that the message has not been replayed. However, if the current value is equal to or less than the previous value, it is determined that the message is an earlier message which has been replayed. An alternative condition could be whether the received value of the replay detection information matches an expected value, which is the next value in a known sequence. Yet another example of a predetermined condition could be whether the current value falls within a predetermined window of acceptable values which are greater than the previous value, but within a certain range of the previous value.

If the predetermined condition is satisfied, then in step S904 it is determined that the command message bonded to the received key distribution message has not been replayed, and therefore the key distribution message has also not been replayed. Accordingly, it is determined that the received encrypted session key is authentic and can be used, and the stored previous value of the replay detection information is replaced with the current value. On the other hand, if the predetermined condition is not satisfied, then in step S905 it is determined that the received command message and the bonded encrypted session key have been replayed and should not be used.

By using replay detection information as shown in FIG. 9, the security of a satellite system can be improved by detecting when a message has been replayed by an aggressor in an attempt to compromise the system.

Figure 10:
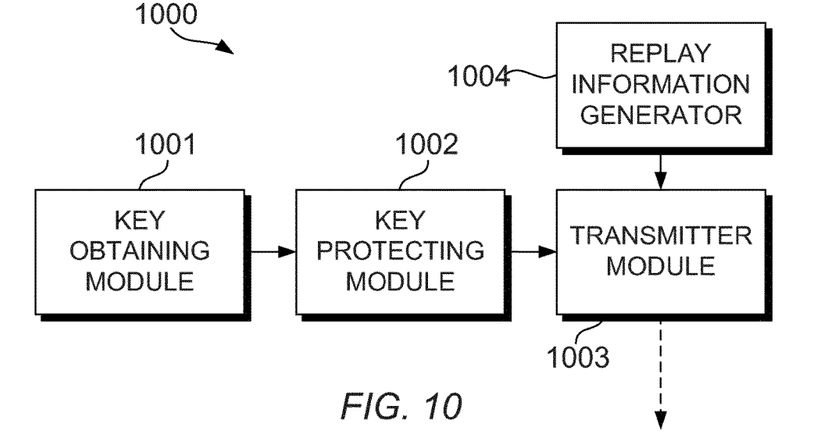
FIG. 10 illustrates a device for transmitting a symmetric key in a satellite system, according to an embodiment of the present invention.

Referring now to FIG. 10, a device for transmitting a session key in a satellite system is illustrated, according to an embodiment of the present invention. In the present embodiment the device 1000 is a satellite, but in other embodiments the device 1000 could be ground equipment such as the control station shown in FIG. 1.

The satellite 1000 comprises a key obtaining module 1001 arranged to obtain a session key, a key protecting module 1002 arranged to protect the obtained session key based on a private key of the satellite and a public key of a device to which the session key is to be transmitted, for example by applying encryption and/or authentication, and a transmitter module 1003 arranged to transmit the protected session key to the device. Also, in the present embodiment the satellite 1000 includes a replay detection information generator 1004 for generating replay detection information. The transmitter module 1003 receives the protected session key from the key protecting module 1002 and receives the replay detection information from the replay detection information generator 1004, and transmits the protected session key and the replay detection information to another device in the satellite system, for example as a key distribution message bonded to a command message, or through a data stream. In other embodiments the replay detection information generator 1004 can be omitted if replay detection information is not required.

Figure 11:
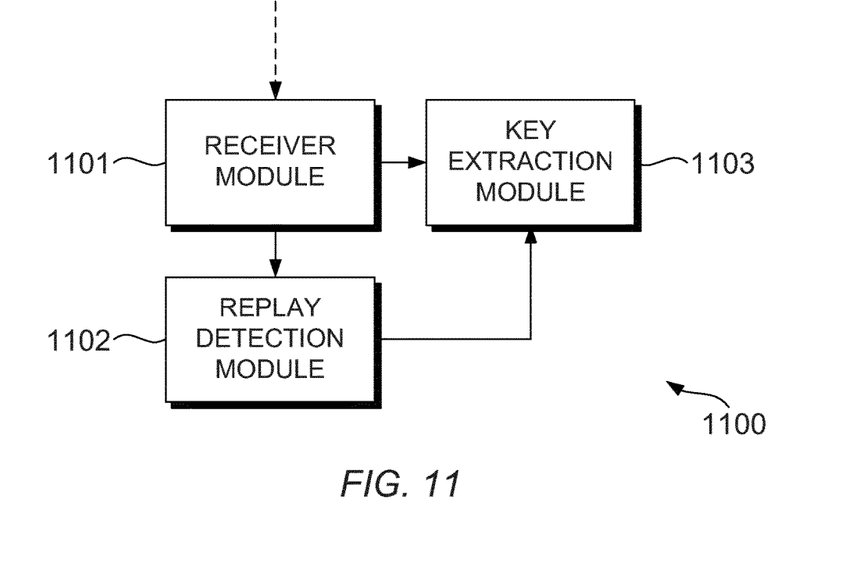
FIG. 11 illustrates a device for receiving a symmetric key in a satellite system according to an embodiment of the present invention.

Referring now to FIG. 11, a device for receiving a session key in a satellite system is illustrated, according to an embodiment of the present invention. In the present embodiment the device 1100 is a satellite, but in other embodiments the device 1100 could be ground equipment such as the control station shown in FIG. 1.

The satellite 1100 comprises a receiver module 1101 arranged to receive a protected session key from another device in the satellite system. For example, the protected session key can be received as a key distribution message bonded to a telecommand as shown in FIG. 6, or received through a telemetry data stream as shown in FIG. 7. The satellite 1100 further comprises a key extraction module 1103 arranged to extract the session key from a received message, for example by decrypting and/or authenticating the protected session key, based on a private key of the satellite and a public key of the device from which the session key was received. In addition, in the present embodiment the satellite 1100 further comprises a replay detection module 1102 arranged to receive replay detection information from the receiver module 1101, which can extract the replay detection information from a received key distribution message or a telecommand. The replay detection module 1102 compares the received replay detection information to an expected value of the replay detection information, as described above with reference to FIG. 9. If the received replay detection information satisfies a predetermined condition, as described above with reference to step S903 of FIG. 9, the replay detection module 1102 signals to the key extraction module 1103 that the received session key is authentic and can safely be passed to other functions within the device 1100 as required. In other embodiments the replay detection module 1102 can be omitted if replay detection is not required.

Figure 12:
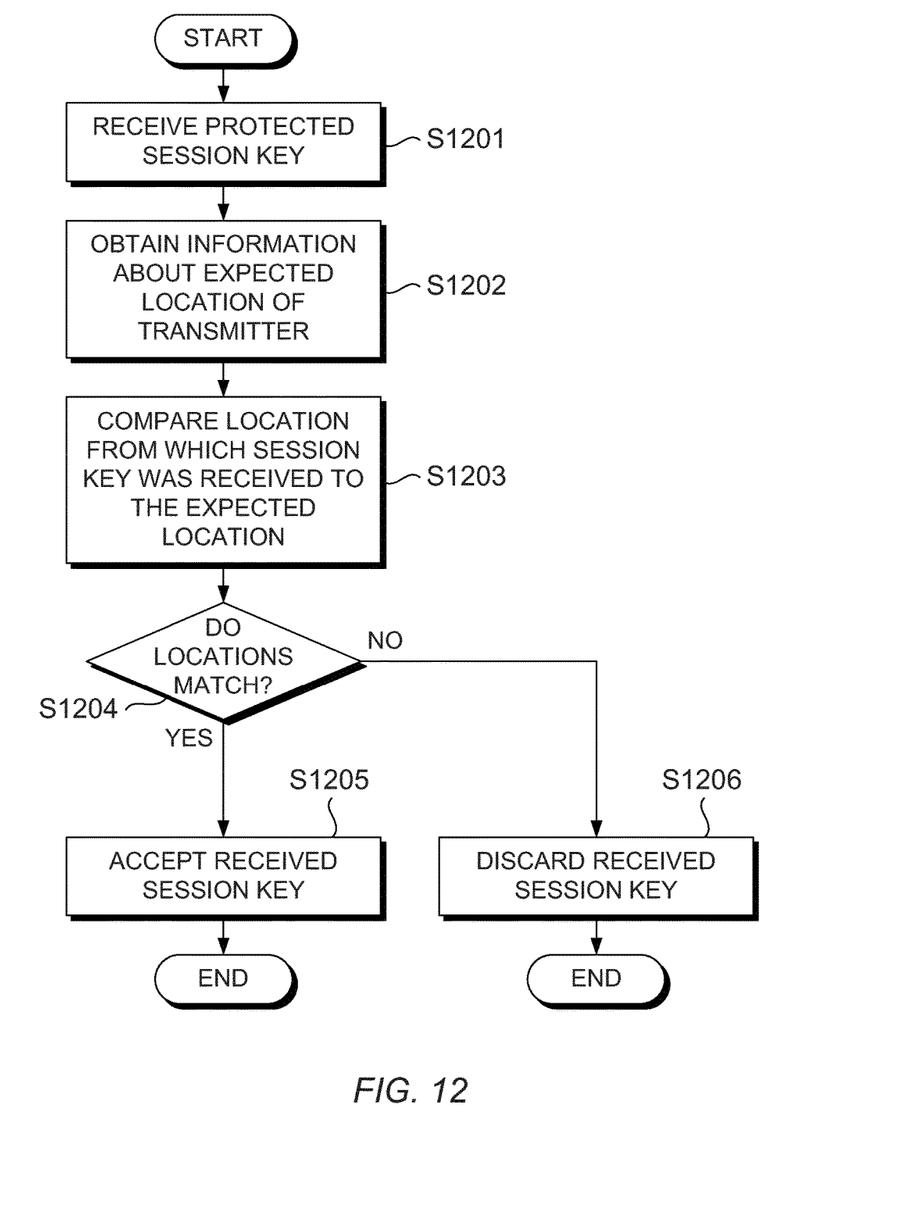
FIG. 12 illustrates a method of authenticating a received session key, according to an embodiment of the present invention.

Referring now to FIG. 12, a method of authenticating a received session key is illustrated, according to an embodiment of the present invention. The method of FIG. 12 is particularly suited to use in embodiments where the received session key is only protected using encryption. First, in step S1201, the protected session key is received. Then, in step S1202, information is obtained about an expected location of the transmitter at the time when the protected session key was transmitted. In step S1203, the expected location is compared to a detected location from which the session key was received, for example as detected by a directional antenna. When the protected session key is received from a satellite in a geostationary orbit, the expected location can be a known position of the satellite. On the other hand, for a satellite in a non-geostationary orbit, the expected location can be determined based on information about the satellite's orbit, a time at which the protected session key was received, and an estimated travel time of the signal from the satellite to the receiver. When the protected session key is received from a stationary transmitter, for example a ground-based control station, the expected location can be a known location of the transmitter.

Then, in step S1204 it is checked whether the detected location matches the expected location, within a predetermined margin of error. If the detected location matches the expected location, then in step S1205 it is assumed that the received session key is authentic and can be accepted. On the other hand, if the detected location does not match the expected location, then in step S1206 the received session key is discarded.

Embodiments of the present invention have been described in which session key distribution in a satellite system is handled by a device in the satellite system, for example the satellite or ground-based equipment such as a control station. At any stage during operation of the satellite system, a new device can be added to the system by transmitting the new device's public key to the device responsible for key distribution. Session keys can then be distributed to the new device by encrypting the session keys using the new device's public key, using any of the above-described methods. Similarly, at any stage during operation of the satellite system, a device can be removed from the system by deleting said device's public key from the device responsible for key distribution. This will prevent the removed device from being issued with any new symmetric keys.

Whilst certain embodiments of the invention have been described above with reference to the drawings, it will be understood that many variations and modifications are possible without departing from the scope of the invention as defined in the claims.

The invention claimed is:

1. A method of accessing protected data in a satellite system comprising first and second devices, wherein the first device is a satellite and the second device is a device arranged to receive signals from the satellite the method comprising:

receiving a protected session key from the first device, at the second device, by receiving a data stream from the satellite at the second device, the data stream including a plurality of predefined parts, extracting a predetermined number of bytes of the protected session key from each one of the plurality of predefined parts, and combining the extracted bytes of the protected session key to obtain the protected session key;

obtaining the session key from the received protected session key at the second device, based on a public key of the first device and a private key of the second device; and accessing protected data received from the first device at the second device, based on the obtained session key, wherein the obtained session key is a next session key for use in the next session following a current session, the method further comprising:

receiving a protected current session key for use in the current session, and validity information defining a time period in which the current session key is valid and a time period in which the next session key is valid, through the data stream;

obtaining the current session key from the protected current session key at the second device, based on a public key of the satellite and a private key of the second device;

obtaining information about a time at which the protected data was transmitted through the data stream; and accessing the protected data based on the current session key if the obtained information indicates that the protected data was transmitted during the time period in which the current session key is valid, or accessing the protected data based on the next session key if the obtained information indicates that the protected data was transmitted during the time period in which the next session key is valid.

2. The method of claim 1, further comprising:

obtaining information about an expected location of the first device when the protected session key was transmitted; and determining that the received protected session key is authentic when a location from which the protected session key was received matches the expected location of the first device, within a predetermined margin of error.

3. A satellite arranged to access protected data received from a second device, the second device comprising a device arranged to receive signals from the satellite, the satellite comprising:

an antenna arranged to receive a protected session key from the second device by receiving a data stream from the second device, the data stream including a plurality of predefined parts;

a first computer readable storage medium arranged to store a computer program which, when executed, causes the satellite to:

extract a predetermined number of bytes of the protected session key from each one of the plurality of predefined parts;

combine the extracted bytes of the protected session key to obtain the protected session key;

obtain the session key from the protected session key, based on a private key of the satellite and a public key of the second device from which the protected session key was received; and access protected data received from the second device, based on the obtained session key, wherein the obtained session key is a next session key for use in the next session following a current session, the satellite is further arranged to receive a protected current session key for use in the current session and validity information defining a time period in which the current session key is valid and a time period in which the next session key is valid, through the data stream, from execution of said stored computer program;

wherein the satellite is further arranged to obtain the current session key from the protected current session key at the second device, based on a public key of the satellite and a private key of the second device, from execution of said stored computer program; and wherein the satellite is further arranged to obtain information about a time at which the protected data was transmitted through the data stream, and access the protected data based on the current session key if the obtained information indicates that the protected data was transmitted during the time period in which the current session key is valid, or access the protected data based on the next session key if the obtained information indicates that the protected data was transmitted during the time period in which the next session key is valid.

* * * * *